Dec. 13, 1966 J. WAKEFIELD ET AL 3,291,992
PAIR OF SEMICONDUCTOR RADIATION DETECTORS HAVING DIFFERENT ATOMIC NUMBERS AND SENSITIVE REGIONS OF DIFFERENT THICKNESS
Filed April 24, 1964 2 Sheets-Sheet 1

Dec. 13, 1966 J. WAKEFIELD ET AL 3,291,992

PAIR OF SEMICONDUCTOR RADIATION DETECTORS HAVING DIFFERENT ATOMIC NUMBERS AND SENSITIVE REGIONS OF DIFFERENT THICKNESS

Filed April 24, 1964 2 Sheets-Sheet 2

United States Patent Office 3,291,992

Patented Dec. 13, 1966

3,291,992

PAIR OF SEMICONDUCTOR RADIATION DETECTORS HAVING DIFFERENT ATOMIC NUMBERS AND SENSITIVE REGIONS OF DIFFERENT THICKNESS

James Wakefield, Woolhampton, Derek George Waters, Reading, and Rex Anthony Pope, Tilehurst, Reading, England, assignors to Associated Electrical Industries Limited, London, England, a British company Filed Apr. 24, 1964, Ser. No. 362,391
Claims priority, application Great Britain, May 2, 1963, 17,386/63
4 Claims. (Cl. 250—83.3)

This invention relates to solid state radiation detectors and has an important application in detectors for gamma and X-rays.

It is known to use devices embodying a reverse biased p-n junction for the detection of charged particles. In operation the devices are exposed to the radiation and when charged particles penetrate the depletion zone in the region of the p-n junction ionisation occurs and a charge pulse passes through the device indicating the radiation.

By pulse height analysis energy spectroscopy can be carried out. Whilst such devices are preferably suitable for charged particles, difficulty, however, occurs when these devices are used for gamma and X-rays. Gamma and X-rays produce secondary $\beta$ particles to cause pulse conduction. Three $\beta$ particles are mainly produced as the result of three effects:

(1) The Compton effect
(2) Photo-electric effects
(3) Pair production effects.

Now both the photo-electric effect and the pair production effect give rise to discrete pulse-height signals, which is the effect required for spectroscopy.

However, the Compton scattering of an incident gamma photon tends to produce a continuum of pulse heights. It is this which gives rise to a background making it difficult to distinguish the required peaks when a range of gamma-ray energies is incident on the detector.

The main object of the invention is to reduce the Compton effect and provide an improved radiation detector.

According to the present invention a radiation detector includes a pair of solid state radiation detectors having different atomic numbers and of relative thicknesses such that substantially equal Compton effects are produced, means for subtracting the electrical outputs of said detectors substantially to remove outputs due to the Compton effect and indicating means responsive to the resultant difference between said outputs.

The term "solid state radiation detector" implies a reverse biased surface barrier or p-n junction type semiconductor device which when exposed to radiation breaks down and passes electrical pulses the amplitude of which depends upon the energy level of the radiation.

Preferably one of the detectors is silicon and the other germanium and the ratio of the thickness of the sensitive region in the silicon detector to that in the germanium detector is 2:1.

Preferably also the junctions are p-i-n junctions.

As above mentioned it is desirable for good spectroscopy to have present in the spectra from the detector only the discrete peaks and to eliminate the Compton continuum. This enables spectroscopy to be carried out simultaneously over a wide range of gamma-ray energies.

The Compton effect predominates in a material with a low atomic number, and the photo-electric and pair production are negligible. In a material with a high atomic number, the photo-electric and pair production effects are relatively very much stronger. Now it can, in fact, be arranged to produce equal Compton effects in two materials with different atomic numbers, by causing the gamma-rays to traverse a greater thickness of the material with the lower atomic number. The photo-electric peak will be negligible and the pair peak much reduced in the material with low atomic number compared to that in the material with high atomic number. By subtracting one spectrum from the other essentially only the photo-peak and a large fraction of the pair peak due to the material with higher atomic number will remain. Germanium with atomic number 32 and silicon with atomic number 14 are a suitable pair of materials.

To match up the count rates in the Compton scattering region for the two devices (assuming the same incident flux intensity on each device and the same surface area for each device) it is necessary that the detection efficiency $\phi$ for Compton scattering processes should be the same for each device. The detection efficiency $\phi$ for Compton scattering, defined as the fraction of the incident flux which undergoes a Compton scattering process in the sensitive region of the detector, is given by $$\phi=1-\exp(-\mu_c x)$$

where $\mu_c$ is the absorption coefficient for Compton scattering and $x$ is the thickness of the sensitive region of the detector. Now the ratio $\mu_c$(germanium)/$\mu_c$(silicon) (where $\mu$ is expressed in cm.$^{-1}$) is very nearly equal to 2 and this ratio remains constant for $\gamma$-ray energies from 300 kev. upwards. Hence the required ratio of thicknesses of silicon to germanium is 2:1.

To match up the pulse heights from the two devices it will be necessary to adjust the gains of the two amplifiers. Using charge sensitive amplifiers, the pulse height will be proportional to $eE/\epsilon$ where E is the energy of the incoming $\gamma$-ray, $e$ is the electronic charge and $\epsilon$ is the energy necessary to create an electron-hole pair. Now $\epsilon$ equals 3.4 ev. for Si and 2.9 ev. for Ge and the gain of the amplifier associated with the silicon detector should be approximately 3.4/2.9=1.17 times the gain of the amplifier associated with the germanium detector.

The above analysis for matching the count rates from the two detectors takes account of single Compton events only in the detector. In fact some of the Compton scattered photons will in turn be totally absorbed in the crystal to produce a full energy signal which will appear in the photo-peak response. The thicker the device is, the more likely is this process. Hence the ratio of silicon sensitive thickness to germanium sensitive thickness required will probably be slightly less than 2:1.

The p-i-n junction may be formed by a process in which the lithium source is located in a stream of inert gas, e.g. argon, and heated preferably to about 700° C. The semi-conductor would also be located in the inert gas stream downstream of the lithium and heated, e.g. to about 200° C. so that the lithium is deposited on it. A layer of aluminium may then be deposited on the lithium to prevent oxidation. Next the semi-conductor is heated to 400° C. in an inert atmosphere so that the lithium diffuses and forms a p-n junction.

Finally, the junction is "drifted" by an ion drift process to give a p-i-n structure; this may be carried out as is known per se by applying a reverse electrical bias to the junction whilst it is heated so as to increase the thickness of the depletion area.

This process is more fully described in co-pending U.S. application Nos. 227,221 now matured into Patent 3,212,943, issued October 19, 1965, and 320,338.

In order that the invention may be more clearly understood reference will now be made to the accompanying drawings, in which.

In the arrangement shown a germanium detector Ge feeds a time sharing gate TSG through a first amplifier AMP1 and a silicon detector Si also feeds the time sharing gate TSG through a first amplifier AMP1 and a silicon detector Si also feeds the time sharing gate through a second amplifier AMP2.

There are two outputs from the time sharing gate to a pulse height analyser.

The pulse-height-analyser shown is the type having, in effect, two memory storage circuits. The time-sharing gate is a device which feeds germanium-signals into one memory and silicon-signals into the second memory, each in turn for consecutive, identical intervals of time. The subtraction of the spectra is accomplished in the analyser, and the remainder spectrum only is displayed.

Figure 1:
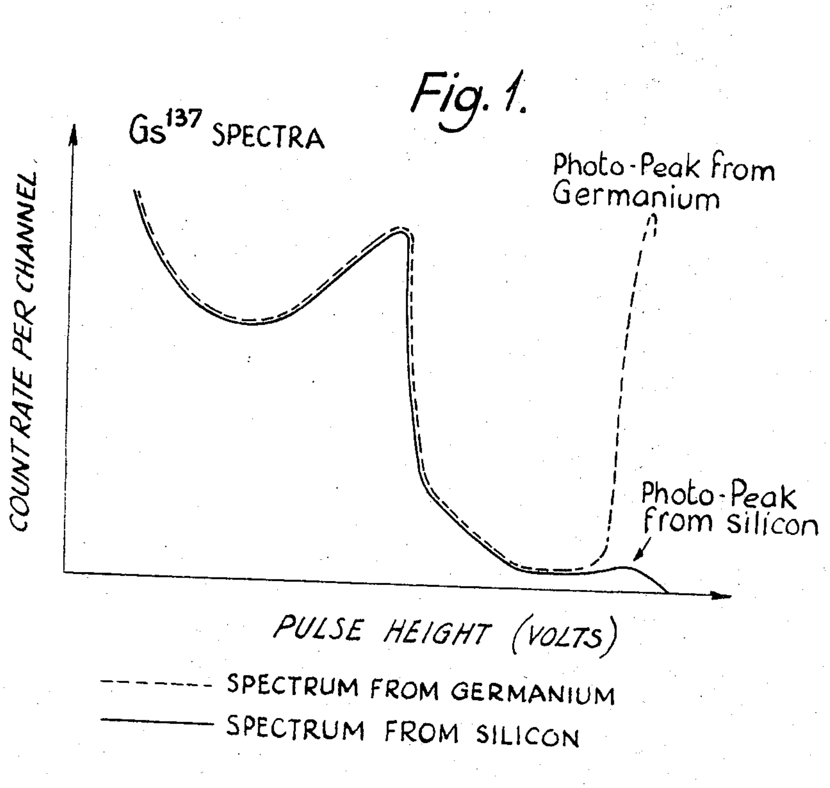
FIG. 1 shows typical pulse height spectra for the 660 kev. from $C_3^{137}$.
Figure 2:
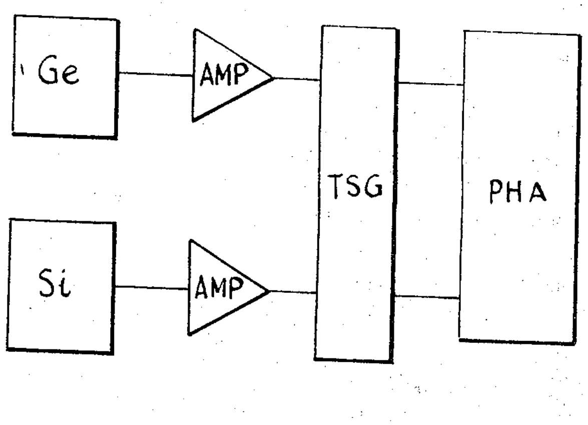
FIG. 2 shows a system which subtracts the silicon-detector spectrum from the germanium-detector spectrum.
Figure 3:
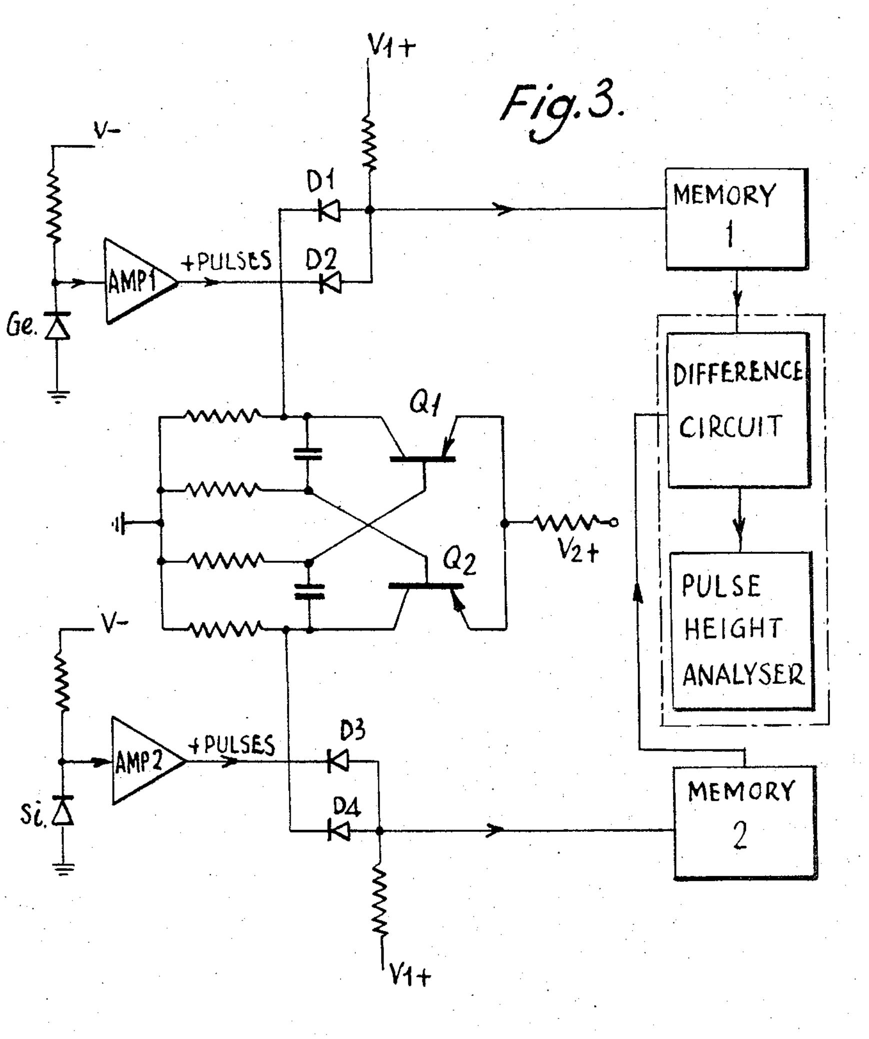
FIG. 3 shows the block circuit of FIG. 2 in greater detail.

As shown in FIG. 3 the time-sharing gate consists of transistors Q1, Q2, operating as a free-running astable multivibrator of unity mark-space ratio. Antiphased square waves positive going, are applied to diodes D1, D4 of the two "AND" gates. D1 and D4 conduct alternately and when D1 cathode is $+ve$ of earth, pulses from the associated amplifier (Ge) can be transmitted through diode D2 to the "Add" input of the analyser. At the same time the output of the (Si) amplifier is clamped at earth by D4, rendering D3 non-conducting to any positive going signals. The roles of the two amplifiers are reversed when D4 cathode is $+ve$ and D1 cathode at earth.

The gain factors of the germanium-detector amplifier and the silicon-detector amplifier are so set that the position of the Compton edge in the spectrum from each detector coincides on the voltage scale at the pulse-height-analyser input.

Pulse height analysers per se are well known and a suitable one would be the type CN1024 manufactured by the Technical Measurement Corp. of 441 Washington Avenue, North Haven, Connecticut, U.S.A.

What we claim is:

1. Radiation detection apparatus comprising a pair of solid state radiation detectors of semi-conductors having different atomic numbers and with sensitive regions of different thicknesses such that substantially equal Compton effects are produced in the electrical outputs of said detectors, each detector output feeding a separate channel, each channel including a separate amplifier, at least one of the amplifiers having means for adjusting the gain thereof, means for subtracting the electrical outputs of said detectors to eliminate Compton effects and indicating means responsive to the resultant difference between said outputs.

2. Radiation detection apparatus comprising a silicon solid state radiation detector and a germanium solid state radiation detector, said detectors having sensitive regions of different thicknesses such that substantially equal Compton effects are produced in the electrical outputs of said detectors, each detector output feeding a separate channel, each channel including a separate amplifier, at least one of the amplifiers having means for adjusting the gain thereof, means for subtracting the electrical outputs of said detectors substantially to eliminate Compton effects and indicating means responsive to the resultant difference between said outputs.

3. Radiation detection apparatus comprising a pair of solid state radiation detectors of semi-conductors having different atomic numbers and with sensitive regions of different thicknesses such that substantially equal Compton effects are produced in the electrical outputs of said detectors, each detector output feeding a separate channel, each channel including a separate amplifier, gate and memory circuit, means for controlling the gates so that signals are fed alternately to the two memories during equal time intervals, means for subtracting the signals in the memory circuits and a pulse height analyser fed with the resultant difference.

4. Radiation detection apparatus comprising a silicon solid state radiation detector and a germanium solid state radiation detector, said detectors having sensitive regions of different thicknesses such that substantially equal Compton effects are produced in the electrical outputs of said detectors, each detector output feeding a separate channel, each channel including a separate amplifier, gate and memory circuit, means for controlling the gates so that signals are fed alternately to the two memories for equal time intervals, means for subtracting the signals in the memory circuits and a pulse height analyser fed with the resultant difference.

References Cited by the Examiner

UNITED STATES PATENTS

| | | | |
|---|---|---|---|
| 2,850,642 | 9/1958 | Seerers ---------- | 250—83.3 X |
| 2,975,286 | 3/1961 | Rappaport et al. ---- | 250—83.3 |
| 3,140,395 | 7/1964 | Scherbatzkoy ------- | 250—71.5 |

RALPH G. NILSON, *Primary Examiner.*

S. ELBAUM, *Assistant Examiner.*